Patented May 22, 1945

2,376,334

UNITED STATES PATENT OFFICE 2,376,334

SYNTHESIS OF BETA-ALANINE

Sidney H. Babcock, Jr., and Bernard R. Baker, Davis, Calif., assignors to The Regents of the University of California, a corporation of California No Drawing. Application January 11, 1941, Serial No. 374,130

10 Claims. (Cl. 260—534)

The present invention relates to the synthesis of amino carboxylic acids or derivatives thereof, said compounds containing alkyl or aromatic radicals, and will be illustrated by the preparation of beta-alanine, which is the beta-amino-propionic acid.

While the amino acids of the character above set forth, and particularly beta-alanine, have previously been prepared by several methods, none of these methods lead to the preparation of beta-alanine economically and efficiently in large quantities with large yields and with a minimum of side reaction products.

At the present time beta-alanine is needed in large quantities as an intermediate to be utilized for the preparation of other compounds. More particularly, beta-alanine is now being used for the preparation of pantothenic acid, a member of the B-complex group of vitamins, as set forth in our co-pending application, Serial No. 346,454, filed July 19, 1940.

In accordance with the present invention, a salt or amide or ester of acrylic acid, the latter being an unsaturated aliphatic acid of the general formula $C_nH_{2n-1}COOH$, is reacted with aqueous ammonia to produce an amino-carboxylic acid, amination and hydrolysis occurring in the same operation. In the more specific form of the present invention, methyl or ethyl acrylate is reacted with aqueous ammonia to produce beta-alanine, the reaction being preferably, although not necessarily carried out under super-atmospheric pressure; and preferably, although not necessarily, under an elevated temperature.

The present invention may be carried out in the presence of a substance which will increase the amount of ammonia in the system. Any substance that will so function may be employed, but most suitably ammonium carbonate is used.

In one form of the invention after the desired product has been crystallized from the reaction mixture, the uncrystallized residue may be added to a new batch and this mixture treated further to recover the desired product.

It is desired to state, as will be hereinafter more particularly pointed out, that to increase the yields, certain critical conditions must be present.

The present invention will be illustrated by the following examples:

Example 1

250 c. c. of methyl acrylate are mixed with 840 c. c. of concentrated ammonium hydroxide (specific gravity 0.90) and 1660 c. c. of water. The reaction mixture is heated in a closed vessel, with gentle agitation, for five hours at temperatures between 140° to 150° C. Under these conditions the pressure is about 200 pounds per square inch.

Beta-alanine is isolated from the so treated reaction mixture by first concentrating the reaction mixture to a syrup and adding to it one liter of methanol. When crystallization begins, 300 c. c. of acetone are added. The mixture is set aside in an icebox for twelve hours. The precipitated beta-analine is then filtered and air dried; the yield being approximately 168 grams, 68%.

In order to remove soluble constituents, the mixture is preferably treated with a menstruum which will effect such removal. While most satisfactory results have been obtained using a 3:1 mixture (by volume) of methanol and acetone, various other compounds, such as ethanol or its mixtures with acetone or diethyl ether may be used to effect the removal of soluble constituents, said removal medium being incapable of reacting with the beta-alanine. Preferably to effect the removal of soluble constituents from the reaction product, the latter is poured into five to ten times its volume of methanol, and, after crystallization has set in, to one-third this amount of acetone. Obviously, however, the amounts of methanol acetone mixture or other compound used for the removal of soluble ingredients may be varied in accordance with the desired purification.

The beta-alanine is then allowed to stand for a sufficient period of time until it has completely settled, and it is then washed and dried. Illustrative of the suitable time, it may be stated that the beta-alanine is left to stand about twelve hours. Here again, it is obvious that the time of settling will vary with the settling characteristics of the beta-alanine, which in turn will depend upon the manner in which it has been precipitated and the fineness of the precipitate.

In the above example, it is stated that the methyl acrylate is treated with 840 c. c. of concentrated aqueous ammonia and 1660 c. c. of water. In general the critical factors are that the strength of the ammonia should vary between 1 and 30%, and that the ratio between the amounts of aqueous ammonia and methyl acrylate should be in a molar ratio varying 2:1 to 30:1. Such reacting conditions increase the yield of the beta-alanine.

While in the example the mixture is heated at a temperature varying between 140 and 150° C., the heating temperature may in general vary between 45° C. and 180° C.

While the time of the reaction has been stated in Example 1 to be five hours, this also is set forth by way of illustration and not by way of limitation, as depending on circumstances, the time may vary from 1 to 48 hours.

In general it may be stated that the beta-alanine may be prepared by the direct action of aqueous ammonia which may be in situ generated, said ammonia being in general of a strength between 1 and 30% at temperatures varying between 45° and 180° C., the pressures being between 15 to 1200 pounds per square inch, with the time of treatment from 1 to 48 hours, the aqueous ammonia being present in a molar ratio compared to the methyl acrylate in amounts varying between 2:1 and 30:1.

In another form of the invention, a further source of ammonia such as ammonium carbonate or its equivalent may be present in amounts varying from 0 to 5 mols by weight to one of methyl acrylate, said reaction being carried out in the presence of the residue from a previous batch which contains a portion of the product it is desired to recover.

*Example 2*

120 c. c. of methyl acrylate is mixed with 1200 c. c. of aqueous ammonia and 680 grams of ammonium carbonate, and the reaction mixture is heated at 160 to 180° with an agitation for about eight hours. The pressure employed is about 1200 pounds per square inch. The reaction mixture is treated as set forth in Example 1 to isolate the beta-alanine, with the exception that a first crop of crystals is obtained, using pure methanol as the solvent, and a second crop is obtained by concentrating to half volume and adding an equal volume of acetone. The yield is 56%.

*Example 3*

120 c. c. of methyl acrylate is mixed with 1200 c. c. of 10% aqueous ammonia and 680 grams of ammonium carbonate, and there is added thereto the uncrystallizable residue from a previous run. The reaction mixture, including the uncrystallizable residue, is then heated at 160 to 180° C. for about six to eight hours, the reaction mass being gently agitated while maintained under a pressure of about 1200 pounds per square inch. Beta-alanine is isolated from the so-treated reaction mixture by treating the latter in accordance with the procedure set forth in Example 2. The yield is 71%.

We have obtained yields of beta-alanine in the outer limits of all the conditions mentioned, but the ones specified in the examples have given the best yields. It is not impossible to suppose that further variations within the limits mentioned would give still better results. The temperature, the concentration of the aqueous ammonia, the molar ratio of ammonia to methyl acrylate, the time and the presence of by-products from previous runs are all critical factors. The pressure seems to be only indirectly a factor; the reaction apparently will only proceed with good yields if the ammonia is prevented from escaping, as by means of a closed vessel. The pressure then rises according to the temperature and available gas space. Any pressure greater than atmospheric seems to be suitable.

The function of the ammonium carbonate appears to be simply a further source of ammonia, developed in situ by decomposition of the ammonium carbonate into ammonia and carbon dioxide. Therefore, any material, organic or inorganic, capable of developing ammonia may be substituted for the ammonium carbonate, provided said material exerts no deleterious effect upon the progress of the reaction, the production of the desired compounds, and the desired yield. In accordance with the disclosed invention, aqueous ammonia is used and the water is not only a solvent but also a reagent. It is desired to point out that the reaction of the acrylic compound with ammonia and with water is accomplished in one operation by the use of aqueous ammonia.

What we claim is:

1. The method of producing beta-alanine comprising the reacting of methyl acrylate with a 10% aqueous ammonium hydroxide solution in a molar ratio of approximately 5 of ammonia to 1 of methyl acrylate, heating the mixture in a closed vessel at a temperature of approximately 140° to 150° C. for approximately five hours and at a pressure of approximately 200 pounds per square inch, concentrating the so-treated reaction mixture to a syrup, crystallizing beta-alanine therefrom in the presence of a mixture of methanol and acetone, chilling for approximately twelve hours, and recovering the beta-alanine.

2. The method of synthesizing beta-alanine with the production of a minimum amount of side reaction products comprising concurrently aminating and hydrolyzing an ester of acrylic acid by heating in a closed vessel at a temperature varying between 45° to 180° C., an ester of acrylic acid with aqueous ammonia of a strength varying between 1% and 30% in a molar ratio of ammonia to acrylic acid ester varying between 2:1 and 30:1, and recovering beta-alanine from the resulting reaction product.

3. The method of synthesizing beta-alanine with the production of a minimum amount of side reaction products comprising concurrently aminating and hydrolyzing an ester of acrylic acid by heating in a closed vessel under a pressure varying between 15 to 1200 pounds per square inch and at a temperature varying between 45° to 180° C., an ester of acrylic acid with aqueous ammonia of a strength varying between 1% and 30% in a molar ratio of ammonia to acrylic acid ester varying between 2:1 and 30:1, and recovering beta-alanine from the resulting reaction mass.

4. The method of synthesizing beta-alanine with the production of a minimum amount of side reaction products comprising concurrently aminating and hydrolyzing a lower alkyl ester of acrylic acid by heating in a closed vessel at a temperature varying between 45° to 180° C., a lower alkyl ester of acrylic acid with aqueous ammonia of a strength varying between 1% and 30% in a molar ratio of ammonia to acrylic acid ester varying between 2:1 and 30:1 for a period of time varying from 1 to 48 hours, and recovering beta-alanine from the resulting reaction mass.

5. The method of synthesizing beta-alanine with the production of a minimum amount of side products comprising concurrently aminating and hydrolyzing a lower alkyl ester of acrylic acid by heating in a closed vessel at a temperature varying between 45° to 180° C., a lower alkyl ester of acrylic acid with aqueous ammonia of a strength varying between 1% and 30% in a molar ratio of ammonia to acrylic acid ester varying between 2:1 and 30:1, there being present an ammonium compound functioning to increase the ammonia content of the system, and recovering beta-alanine from the resulting reaction mass.

6. The method of synthesizing beta-alanine with the production of a minimum amount of side reaction products comprising concurrently aminating and hydrolyzing a lower alkyl ester of acrylic acid by heating in a closed vessel at a temperature varying between 45° to 180° C., a lower alkyl ester of acrylic acid with aqueous ammonia of a strength varying between 1% and 30% in a molar ratio of ammonia to acrylic acid ester varying between 2:1 and 30:1, for a period of time varying from 1 to 48 hours, treating the reaction mass to recover beta-alanine therefrom and leave a mother liquor, adding the latter to a batch of said reacting constituents, and repeating the method in the presence of said mother liquor.

7. The method of synthesizing beta-alanine with the production of a minimum amount of side products comprising concurrently aminating and hydrolyzing a lower alkyl ester of acrylic acid by heating in a closed vessel at a temperature varying between 45° to 180° C., a lower alkyl ester of acrylic acid with aqueous ammonia of a strength varying between 1% and 30% in a molar ratio of ammonia to acrylic acid ester varying between 2:1 and 30:1 for a period varying from 1 to 48 hours, there being present an ammonium compound functioning to increase the ammonia content of the system, treating the reaction mass to recover beta-alanine therefrom and leave a mother liquor, adding the latter to a batch of said reacting constituents, and repeating the method in the presence of said mother liquor.

8. The method of synthesizing beta-alanine with the production of a minimum amount of side products comprising concurrently aminating and hydrolyzing a lower alkyl ester of acrylic acid by heating in a closed vessel at a temperature varying between 45° to 180° C., a lower alkyl ester of acrylic acid with aqueous ammonia of a strength varying between 1% and 30% in a molar ratio of ammonia to acrylic acid ester varying between 2:1 and 30:1, there being present an ammonium compound functioning to increase the ammonia content of the system, the molar ratio of said ammonium compound to the acrylic acid ester not exceeding 5, and recovering the beta-alanine from the resulting reaction mass.

9. The method of synthesizing beta-alanine with the production of a minimum amount of side reaction products comprising concurrently aminating and hydrolyzing a lower alkyl ester of acrylic acid by heating at a temperature varying between 45° to 180° C. and under super-atmospheric pressure a mixture of said compound and aqueous ammonia of a strength varying between 1% and 30%, the molar ratio of the ammonia to said acrylic compound varying between 2:1 and 30:1, and recovering beta-alanine from the resulting reaction mass.

10. The method of synthesizing beta-alanine with the production of a minimum amount of side reaction products comprising concurrently aminating and hydrolyzing a lower alkyl ester of acrylic acid by heating at a temperature varying between 45° to 180° C. and under super-atmospheric pressure a mixture of said compound and aqueous ammonia of a strength varying between 1% and 30%, the molar ratio of the ammonia to said acrylic compound varying between 2:1 and 30:1, there also being present an ammonium compound functioning to increase the ammonia content of the system, and recovering beta-alanine from the resulting reaction mass.

SIDNEY H. BABCOCK, Jr.
BERNARD R. BAKER.